United States Patent
Lee et al.

(10) Patent No.: US 9,565,606 B2
(45) Date of Patent: Feb. 7, 2017

(54) CONTROLLING SIGNAL TRANSMISSION IN RADIO UNITS

(75) Inventors: Ki-Ho Lee, Gyeonggi-do (KR); Yong-Gyoo Lee, Seoul (KR); Yung-Ha Ji, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 13/587,742

(22) Filed: Aug. 16, 2012

(65) Prior Publication Data

US 2013/0044622 A1    Feb. 21, 2013

(30) Foreign Application Priority Data

Aug. 16, 2011  (KR) .................. 10-2011-0081337

(51) Int. Cl.
- *H04W 24/00* (2009.01)
- *H04W 36/18* (2009.01)
- *H04B 7/02* (2006.01)
- *H04W 88/08* (2009.01)

(52) U.S. Cl.
CPC ............ *H04W 36/18* (2013.01); *H04B 7/022* (2013.01); *H04W 88/085* (2013.01)

(58) Field of Classification Search
CPC ........ H04W 64/00; H04W 4/02; H04W 36/08; H04W 36/18; H04W 4/021; H04W 92/20; H04W 88/085; H04B 7/022
USPC .................... 370/241, 252; 455/442, 443
See application file for complete search history.

(56) References Cited

U.S. PATENT DOCUMENTS

| | | | |
|---|---|---|---|
| 5,864,760 A * | 1/1999 | Gilhousen et al. | ........... 455/442 |
| 6,081,714 A | 6/2000 | Wakizaka | |
| 6,466,790 B2 | 10/2002 | Haumont et al. | |
| 6,473,442 B1 | 10/2002 | Lundsjoe et al. | |

(Continued)

FOREIGN PATENT DOCUMENTS

| KR | 10-0304781 B1 | 9/2001 |
|---|---|---|
| KR | 10-2005-0068400 A | 7/2005 |

(Continued)

OTHER PUBLICATIONS

ETSI TS 123 272 V8.1.0, "Digital cellular telecommunications system (Phase 2+); Universal Mobile Telecommunications System (UMTS); Circuit Switched (CS) fallback in Evolved Packet System (EPS); Stage 2", ETSI, Nov. 2008, pp. 1-47.

(Continued)

*Primary Examiner* — Chi H Pham
*Assistant Examiner* — Robert Lopata
(74) *Attorney, Agent, or Firm* — IP Legal Services, LLC (57) ABSTRACT

Described embodiments provide controlling signal transmission in a plurality of radio units. The plurality of radio units may be coupled to a digital unit. The digital unit may be spatially separated from the plurality of radio units. Signal quality measurements may be received from multiple radio units when a user equipment is located within an overlapping service area of the multiple radio units. Determination may be made as to whether to simultaneously use at least two of the multiple radio units to transmit a data signal to the user equipment based on the received signal quality measurements. At least two of the multiple radio units may be controlled to transmit a same data signal to the user equipment using a same channel based on the determination result.

19 Claims, 6 Drawing Sheets

(56) References Cited

U.S. PATENT DOCUMENTS

| | | | |
|---|---|---|---|
| 6,526,028 B1* | 2/2003 | Kondo | 370/333 |
| 6,728,919 B1* | 4/2004 | Kondo et al. | 714/751 |
| 6,845,238 B1 | 1/2005 | Muller | |
| 6,975,604 B1* | 12/2005 | Ishida et al. | 370/331 |
| 7,072,655 B2* | 7/2006 | Ikeda et al. | 455/436 |
| 7,200,403 B2* | 4/2007 | Hamabe | 455/442 |
| 7,796,514 B2 | 9/2010 | Noriega | |
| 8,045,926 B2* | 10/2011 | Martikkala et al. | 455/63.4 |
| 8,149,895 B2* | 4/2012 | Bolourchi et al. | 375/142 |
| 8,165,089 B2 | 4/2012 | Jung et al. | |
| 8,379,567 B2 | 2/2013 | Cho et al. | |
| 8,406,193 B2 | 3/2013 | Cho et al. | |
| 8,446,869 B2 | 5/2013 | Lee et al. | |
| 8,472,921 B2* | 6/2013 | Yang et al. | 455/412.1 |
| 8,509,783 B2 | 8/2013 | Iwamura | |
| 8,867,432 B2 | 10/2014 | Lee et al. | |
| 8,868,086 B2 | 10/2014 | Lee et al. | |
| 2001/0011019 A1 | 8/2001 | Jokimies | |
| 2003/0002467 A1 | 1/2003 | Leung | |
| 2004/0001436 A1 | 1/2004 | Cuffaro et al. | |
| 2004/0114593 A1 | 6/2004 | Dick et al. | |
| 2004/0203926 A1* | 10/2004 | Ruutu et al. | 455/456.1 |
| 2004/0235510 A1* | 11/2004 | Elicegui et al. | 455/522 |
| 2005/0005095 A1 | 1/2005 | Meandzija et al. | |
| 2005/0048980 A1* | 3/2005 | Kumar et al. | 455/443 |
| 2005/0073988 A1 | 4/2005 | Kroth et al. | |
| 2005/0249322 A1* | 11/2005 | Gerlach | 375/355 |
| 2006/0003696 A1 | 1/2006 | Diaz Cervera et al. | |
| 2006/0077923 A1 | 4/2006 | Niwano | |
| 2006/0092872 A1 | 5/2006 | Lee et al. | |
| 2006/0104229 A1* | 5/2006 | Vannithamby | H04W 72/082 370/328 |
| 2006/0178153 A1 | 8/2006 | Tenny et al. | |
| 2007/0087689 A1 | 4/2007 | Alles et al. | |
| 2007/0184841 A1 | 8/2007 | Choi et al. | |
| 2007/0190997 A1* | 8/2007 | Moon | H04B 7/022 455/422.1 |
| 2008/0139204 A1* | 6/2008 | Hsieh et al. | 455/436 |
| 2008/0181182 A1 | 7/2008 | Carichner et al. | |
| 2008/0199183 A1 | 8/2008 | Liu et al. | |
| 2008/0219222 A1 | 9/2008 | Lo et al. | |
| 2009/0041056 A1 | 2/2009 | Okamoto et al. | |
| 2009/0135778 A1 | 5/2009 | Lee et al. | |
| 2009/0233616 A1* | 9/2009 | Kwon | H04J 13/00 455/452.2 |
| 2009/0238143 A1 | 9/2009 | Mukherjee et al. | |
| 2009/0291632 A1 | 11/2009 | Braithwaite et al. | |
| 2009/0310568 A1 | 12/2009 | Chen et al. | |
| 2010/0008324 A1 | 1/2010 | Lee et al. | |
| 2010/0015978 A1 | 1/2010 | Yoon et al. | |
| 2010/0067442 A1 | 3/2010 | Van der Wal et al. | |
| 2010/0075679 A1 | 3/2010 | Tenny et al. | |
| 2010/0113032 A1 | 5/2010 | Lee et al. | |
| 2010/0128663 A1* | 5/2010 | Kuroda | H04L 1/0007 370/328 |
| 2010/0136979 A1* | 6/2010 | Yang et al. | 455/442 |
| 2010/0144334 A1 | 6/2010 | Gorokhov et al. | |
| 2010/0178916 A1 | 7/2010 | Jamadagni | |
| 2010/0216474 A1 | 8/2010 | Park et al. | |
| 2010/0273485 A1 | 10/2010 | Huang et al. | |
| 2010/0278146 A1 | 11/2010 | Aoyama et al. | |
| 2010/0278150 A1 | 11/2010 | Park et al. | |
| 2011/0013560 A1 | 1/2011 | Zhang et al. | |
| 2011/0016214 A1 | 1/2011 | Jackson | |
| 2011/0022812 A1 | 1/2011 | van der Linden et al. | |
| 2011/0092214 A1 | 4/2011 | Iwamura | |
| 2011/0096736 A1 | 4/2011 | Kwon et al. | |
| 2011/0116513 A1 | 5/2011 | Gilson | |
| 2011/0176477 A1 | 7/2011 | Lee et al. | |
| 2011/0176485 A1 | 7/2011 | Pudney et al. | |
| 2011/0207459 A1 | 8/2011 | Ramasamy et al. | |
| 2011/0237272 A1 | 9/2011 | Gorokhov et al. | |
| 2011/0274040 A1 | 11/2011 | Pani et al. | |
| 2011/0312355 A1 | 12/2011 | Cheng et al. | |
| 2012/0039216 A1 | 2/2012 | Li et al. | |
| 2012/0221683 A1 | 8/2012 | Ferris | |
| 2012/0322477 A1* | 12/2012 | Kang et al. | 455/501 |
| 2013/0089021 A1 | 4/2013 | Gaal et al. | |
| 2013/0103844 A1 | 4/2013 | Bulut et al. | |
| 2013/0163416 A1* | 6/2013 | Lee et al. | 370/229 |
| 2013/0242951 A1* | 9/2013 | Lee et al. | 370/336 |
| 2014/0052864 A1 | 2/2014 | Van Der Linden et al. | |

FOREIGN PATENT DOCUMENTS

| | | |
|---|---|---|
| KR | 10-2005-0121136 A | 12/2005 |
| KR | 10-2006-0016016 A | 2/2006 |
| KR | 10-2006-0040237 A | 5/2006 |
| KR | 10-2007-0079633 A | 8/2007 |
| KR | 10-2007-0110348 A | 11/2007 |
| KR | 10-2008-0026855 A | 3/2008 |
| KR | 10-2008-0041543 A | 5/2008 |
| KR | 10-2008-0041545 A | 5/2008 |
| KR | 10-2008-0064691 A | 7/2008 |
| KR | 10-2008-0080801 A | 9/2008 |
| KR | 10-0873386 B1 | 12/2008 |
| KR | 10-2009-0034261 A | 4/2009 |
| KR | 10-2009-0073443 A | 7/2009 |
| KR | 10-0920894 B1 | 10/2009 |
| KR | 10-2010-0003664 A | 1/2010 |
| KR | 10-2010-0004833 A | 1/2010 |
| KR | 10-2010-0021156 A | 2/2010 |
| KR | 10-2010-0029869 A | 3/2010 |
| KR | 10-2010-0035088 A | 4/2010 |
| KR | 10-2010-0048841 A | 5/2010 |
| KR | 10-2010-0060353 A | 6/2010 |
| KR | 10-2010-0066875 A | 6/2010 |
| KR | 10-2010-0087382 A | 8/2010 |
| KR | 10-2010-0092742 A | 8/2010 |
| KR | 10-0976943 B1 | 8/2010 |
| KR | 10-2010-0126776 A | 12/2010 |
| KR | 10-2010-0126818 A | 12/2010 |
| KR | 10-2010-0133821 A | 12/2010 |
| KR | 10-1030897 B1 | 4/2011 |
| KR | 10-2011-0094140 A | 8/2011 |
| KR | 10-2011-0097702 A | 8/2011 |
| KR | 10-2011-0099327 A | 9/2011 |
| WO | 2008/110924 A2 | 9/2008 |
| WO | 2010/068769 A1 | 6/2010 |
| WO | 2010/123270 A2 | 10/2010 |
| WO | 2010/127365 A1 | 11/2010 |
| WO | 2011/022733 A2 | 2/2011 |

OTHER PUBLICATIONS

Ralf Irmer et al., "Coordinated multipoint: Concepts, Performance, and Field Trial Results", IEEE Communications Magazine, Feb. 2011, pp. 102-111, vol. 49, Issue 2.

* cited by examiner

CONTROLLING SIGNAL TRANSMISSION IN RADIO UNITS

CROSS REFERENCE TO PRIOR APPLICATIONS

The present application claims priority under 35 U.S.C. §119 to Korean Patent Application No. 10-2011-0081337 (filed on Aug. 16, 2011), which is hereby incorporated by reference in its entirety.

The subject matter of this application is related to U.S. patent application Ser. No. 13/326,734 filed Dec. 15, 2011, U.S. patent application Ser. No. 13/570,312 filed Aug. 9, 2012, the teachings of which are incorporated herein their entirety by reference.

FIELD OF THE INVENTION

The present invention relates to communications and, in particular, to controlling signal transmission in radio units.

BACKGROUND OF THE INVENTION

A typical base station may include a digital unit, a radio unit, and an antenna. The digital unit may be referred to as a baseband unit. Such a typical base station has a structural limitation to optimize a cell design. Accordingly, a distributed antenna system has been introduced. In the distributed antenna system, a plurality of antennas is spatially separated from the base station and distributedly installed at various locations, for example, each floor of an office building. Such a plurality of antennas may be connected to a radio unit in the base station. The distributed antenna system may enable various cell designs and reduce coverage holes. The distributed antenna system, however, may have a limitation in maximizing system capacity.

SUMMARY OF THE INVENTION

This summary is provided to introduce a selection of concepts in a simplified form that is further described below in the Detailed Description. This summary is not intended to identify key features or essential features of the claimed subject matter, nor is not intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, signal transmission in radio units may be controlled to maximize radio capacity and to improve efficiency in using radio resources.

In accordance with another aspect of the present invention, radio units may be controlled to transmit the same data signal to user equipment through the same channel when the user equipment is located within an overlapping service area of the radio units.

In accordance with embodiments of the present invention, a method may be provided for controlling signal transmission in a plurality of radio units coupled to a digital unit that is spatially separated from the plurality of radio units. The method may include receiving signal quality measurements from multiple radio units when a user equipment is located within an overlapping service area of the multiple radio units, determining whether to simultaneously use at least two of the multiple radio units to transmit a data signal to the user equipment based on the received signal quality measurements, and controlling at least two of the multiple radio units to transmit a same data signal to the user equipment using a same channel based on the determination result.

The receiving signal quality measurements may include requesting each one of the multiple radio units to measure a signal quality of a signal received from the user equipment. Each one of the multiple radio units may measure the signal quality of a signal received from the user equipment and transmits the signal quality measurement to the digital unit. The signal quality measurements may be a result of measuring a signal intensity of a signal received from the user equipment to each one of the multiple radio units.

The determining may include determining whether the received signal quality measurements are more than two, selecting a largest signal quality measurement from the received signal quality measurements when the received signal quality measurements are more than two, obtaining a difference between the selected largest signal quality measurement and any other signal quality measurement included in the received signal quality measurements, and comparing the difference with a predetermined threshold.

The determining may include determining whether the received signal quality measurements are more than two, obtaining a difference between the two received signal quality measurements when the received signal quality measurements are two, and comparing the difference with a predetermined threshold.

The controlling at least two of the multiple radio units may include transmitting the same data signal to the user equipment by simultaneously using the at least two of the multiple radio units when the difference is smaller than the predetermined threshold.

The controlling at least two of the multiple radio units may include allocating the same channel to the at least two of the multiple radio units to transmit the same data signal when the difference is smaller than the predetermined threshold.

The user equipment may recognize the received data signals as a multipath signal when the same data signals are received through the same channel from at least two radio units. Then, the user equipment may restore an original signal by combining the received data signals from the at least two radio units.

The controlling may include allocating one of a same symbol and a same subcarrier to the at least two of multiple radio units to transmit the same data signal when orthogonal frequency division multiplexing (OFDM) is employed. The controlling may include allocating a same code to the at least two of multiple radio units to transmit the same data signal when wideband code division multiple access (WCDMA) is employed.

In accordance with another embodiment of the present invention, a digital unit may be provided for controlling signal transmission in a plurality of radio units coupled to and spatially separated from the digital unit. The digital unit may include a receiver, a determination unit, and a controlling unit. The receiver may be configured to receive signal quality measurements from multiple radio units when user equipment is located within an overlapping service area of the multiple radio units. The determination unit may be configured to determine whether to simultaneously use at least two of the multiple radio units to transmit a data signal to the user equipment based on the received signal quality measurements. The controlling unit may be configured to control at least two of the multiple radio units to transmit a same data signal to the user equipment using a same channel based on the determination result.

Each one of the multiple radio units may measure the signal quality of a signal received from the user equipment and transmits the signal quality measurement to the digital unit. The signal quality measurements may be a result of measuring a signal intensity of a signal received from the user equipment to each one of the multiple radio units.

The determination unit may be configured to determine whether the received signal quality measurements are more than two. When the received signal quality measurements are more than two, the determination unit may be configured to select a largest signal quality measurement from the received signal quality measurements and obtain a difference between the selected largest signal quality measurement and any other signal quality measurement included in the received signal quality measurements. Otherwise, when the received signal quality measurements are two, the determination unit may be configured to obtain a difference between the two received signal quality measurements. The determination unit may be configured to compare the difference with a predetermined threshold.

The controlling unit may be configured to transmit the same data signal to the user equipment by simultaneously using the at least two of the multiple radio units when the difference is smaller than the predetermined threshold. The controlling unit may be configured to allocate the same channel to the at least two of the multiple radio units to transmit the same data signal when the difference is smaller than the predetermined threshold.

The user equipment may be configured to recognize the same data signals as a multipath signal when receiving the same data signals through the same channel from at least two radio units and restore an original signal by combining the received data signals from the at least two radio units.

In accordance with still another embodiment of the present invention, a base station system may include a plurality of radio units and a digital unit. Each one of the plurality of radio units may be configured to measure a signal intensity value of a signal received from user equipment located within an overlapping service area of the plurality of radio units. The digital unit may be configured to receive the signal intensity values from the plurality of radio units and to determine whether to simultaneously use at least two of the plurality of radio units to transmit a data signal to the user equipment using a same channel.

The digital unit may be configured to determine whether the received signal quality measurements are more than two. When the received signal quality measurements are more than two, the digital unit may select a largest signal quality measurement from the received signal quality measurements and obtain a difference between the selected largest signal quality measurement and any other signal quality measurement included in the received signal quality measurements. When the received signal quality measurements are two, the digital unit may obtain a difference between the two received signal quality measurements. The digital unit may compare the difference with a predetermined threshold and transmit the same data signal to the user equipment by simultaneously using the at least two of the multiple radio units when the difference is smaller than the predetermined threshold.

In accordance with yet another embodiment of the present invention, a digital unit may be provided for controlling signal transmission in a plurality of related radio units. The digital unit may be spatially separated from the plurality of related radio units each installed at a corresponding service area and processing a radio signal. The digital unit may include a receiver, a determination unit, and a controlling unit. The receiver may be configured to receive, from at least two radio units included in the plurality of radio units, signal intensity values of uplink signals received from one user equipment. The determination unit may be configured to calculate a difference between a largest signal intensity value and other signal intensity value, which are included in the received signal intensity values. When the difference is smaller than a predetermined threshold, the controlling unit may be configured to control the at least two of the plurality of radio units to transmit the same data signal to the at least one user equipment through the same channel.

In accordance with yet another embodiment of the present invention, a base station system may include a digital unit and a plurality of radio units. The digital unit may be configured to digitally process a signal and coupled to a core system. The plurality of radio units may be configured to be spatially separated from the digital unit, controlled to receive a digital signal from the digital unit, convert the digital signal to a radio signal, and amplify the radio signal. The plurality of radio units may be configured to be controlled to transmit the same data signal to one user equipment in response to the control of the digital unit. Each one of the radio units may transmit, to the digital unit, a signal intensity value of an uplink signal received from the user equipment. The digital unit may be configured to control at least two of the plurality of radio units to transmit the same data signal when a difference between the largest signal intensity value and any other signal intensity value is smaller than a predetermined threshold. The digital unit may be configured to allocate the same radio resources to at least two of the plurality of radio units to transmit a data signal to user equipment when a difference between the largest signal intensity value and any other signal intensity value is smaller than a predetermined threshold. The digital unit may be configured to transmit the same data to at least two of the plurality of radio units.

In accordance with yet another embodiment of the present invention, a method may be provided for controlling signal transmission in a plurality of radio units by a digital unit. The digital unit may be spatially separated from the plurality of related radio units each installed at a corresponding service area and processing a radio signal. The method of the digital unit may include receiving, from at least two radio units included in the plurality of related radio units, signal intensity values of uplink signals received from a user equipment, evaluating radio link quality between the at least two radio units and the user equipment based on the received signal intensity values, and transmitting the same data signal to the at least two radio units when the at least two radio units have the similar radio link quality to the user equipment.

In accordance with yet another embodiment of the present invention, a method may be provided for controlling signal transmission in a plurality of radio units. The digital unit may be spatially separated from the plurality of related radio units each installed at a corresponding service area and processing a radio signal. The method of each radio unit may include transmitting, to a digital unit, a signal intensity value of an uplink signal received from a user equipment, and transmitting a data signal in response to the control of the digital unit. The data signal may be similar to that transmitted from a neighbor radio unit.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Reference will now be made in detail to embodiments of the present invention, examples of which are illustrated in the accompanying drawings, wherein like reference numerals refer to like elements throughout. The embodiments are described below, in order to explain the present invention by referring to the figures.

The term "user equipment" as used herein may refer to any of a terminal, a mobile station (MS), a mobile terminal (MT), a subscriber station (SS), a portable subscriber station (PSS), and an access terminal (AT), and may include some or all of the functions thereof.

The term "base station (BS)" as used herein may refer to any of an access point (AP), a radio access station (RAS), a node B, an evolved node B (eNodeB), a base transceiver station (BTS), and a mobile multihop relay (MMR)-BS, and may include some or all of the functions thereof.

Figure 1:
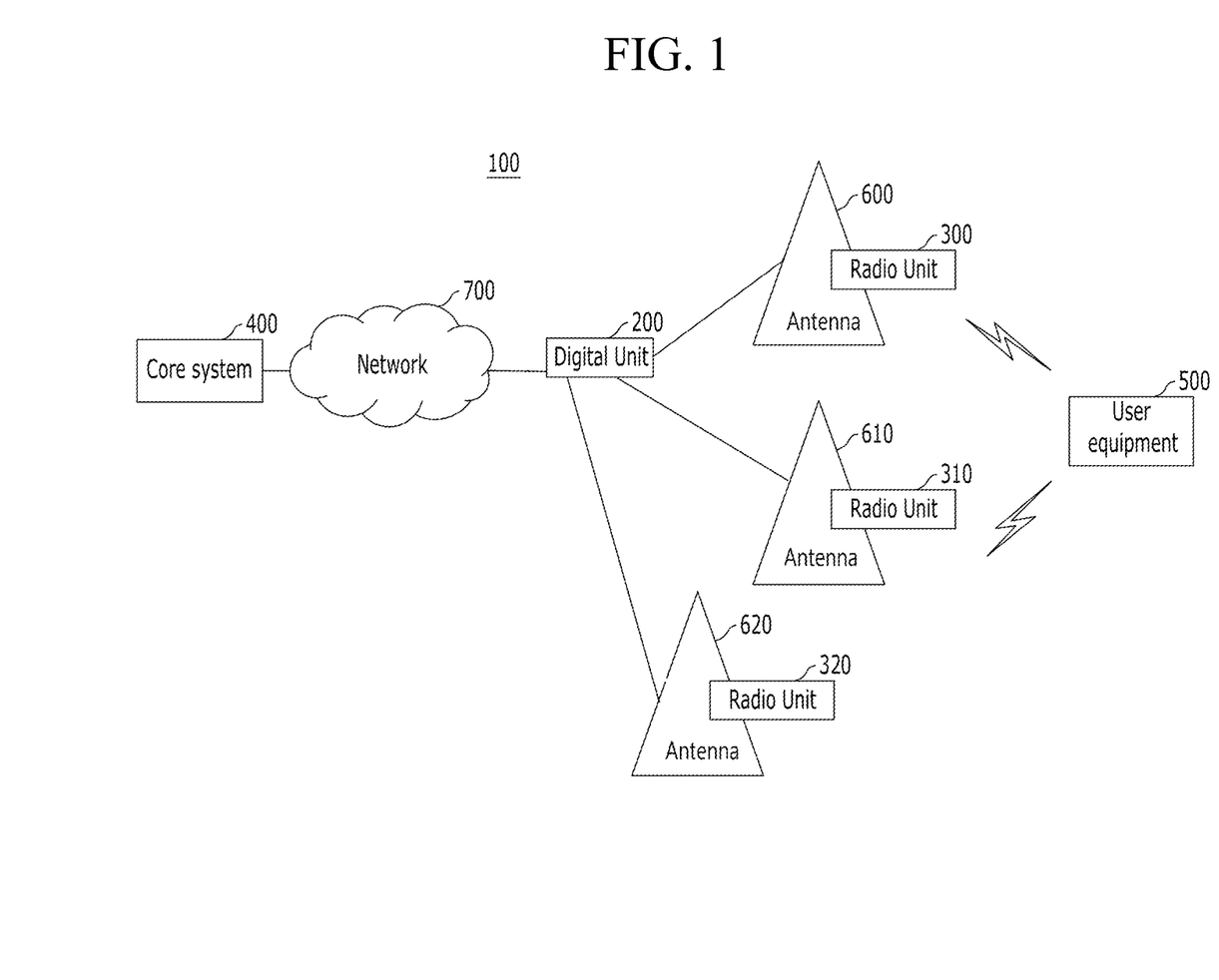
FIG. 1 shows a base station system for maximizing a radio capacity in accordance with embodiments of the present invention.

FIG. 1 shows a base station system for maximizing a radio capacity in accordance with embodiments of the present invention.

Referring to FIG. 1, base station system 100 may include digital unit 200 and plurality of radio units 300, 310, and 320 in accordance with embodiments of the present invention. Unlike a typical base station system, digital unit 200 may be spatially separated from plurality of radio units 300, 310, and 320 and installed at different locations in accordance with embodiments of the present invention. For example, digital unit 200 may be installed in a base station (not shown) or in a digital unit center (not shown) of a central office with a switching system. Digital unit 200 may be coupled to core system 400 through communication network 700. Such digital unit 200 may be coupled to a plurality of radio units 300, 310, and 320 through an optical interface, but the present invention is not limited thereto. Digital unit 200 may be referred to as a baseband unit. Base station system 100 may be a part of a cloud communication center network, which is also known as a virtual radio network.

Digital unit 200 may transmit and receive signals to/from radio units 300, 310, and 320. Digital unit 200 may be constituent elements for process signals digitally. For example, digital unit 200 may encrypt and decrypt the signals. The signals may be a radio digital signal generated based on with $3^{rd}$ generation partnership project (3GPP), worldwide interoperability for microwave access (Wi-MAX), Wireless Broadband (WiBro), and/or long term evolution (LTE), but the present invention is not limited thereto. Digital unit 200 may be connected to core system 400 through network 700.

As described, digital unit 200 may be spatially separated from radio units 300, 310, and 320 and installed at different locations such as a corresponding base station and a digital unit center (not shown). The digital unit 200 may be installed at a corresponding base station (not shown) and the base station may be connected to core system 400 through communication network 700. The present invention, however, is not limited thereto. Digital unit 200 may be installed at a digital unit center (not shown). The digital unit center may include a plurality of digital units in a cloud computing center system. The digital units may be centralized in the digital unit center installed at a central office with a switching system in a cloud computing center system. Accordingly, digital unit 200 may be a virtualized base station. Digital unit 200 may be coupled to corresponding radio units 300, 310, and 320 through an optical interface, but the present invention is not limited thereto. Digital unit 200 may be coupled to a plurality of radio units 300, 310, and 320 and manage and control coupled radio units 300, 310, and 320, but the present invention is not limited thereto. Digital unit 200 may be coupled to one radio unit.

Radio units 300, 310, and 320 may be distributed installed at various locations with corresponding antennas 600, 610, and 620. For example, radio units 300, 310, and 320 may be installed with at least one antenna at each floor of an office building in accordance with embodiments of the present invention. Such a structure may enable to form various types of cells and reduce coverage holes. Radio units 300, 310, and 320 may be controlled and managed by coupled digital unit 200. For example, each one of radio units 300, 310, and 320 may receive signals from digital unit 200, process the received signals, and transmit the processed signal to user equipment 500. Furthermore, radio units 300, 310, and 320 may receive signals from user equipment 500, process the received signals, and transmit the processed signals to digital unit 200. In general, radio units 300, 310, and 320 may be a set of elements for processing a radio frequency signal. For example, radio units 300, 310, and 320 may convert digital signals from digital unit 200 to a radio frequency signal according to a frequency band, amplify the radio frequency signal, and transmit the radio frequency signal through antennas (not shown). Accordingly, radio units 300, 310, and 320 may include a converter and an amplifier.

In accordance with embodiments of the present invention, digital unit 200 may control signals transmission in radio units 300, 310, and 320. For example, digital unit 200 may use multiple radio units to simultaneously transmit a data signal to user equipment through a same channel when the user equipment is located in overlapping service areas of the multiple radio units. In this case, digital unit 200 may allocate the same radio resource to related radio units to transmit a data signal to user equipment. For example, the multiple radio units may transmit the same data signal to the user equipment through the same channel in response to the control of digital unit 200. Such operation will be described in detail with reference to FIG. 3 to FIG. 6.

Core system 400 may be coupled to digital unit 200 through network 700. Core system 400 may manage connection between digital unit 200 and an external network. Core system 400 may include a switching center (not shown). Such base station system 100 may for various cell structures because radio units 300, 310, and 320 with antennas 600, 610, and 620 are spatially separated from digital unit 200 and installed at different locations. Hereinafter, such cell structure in accordance with embodiments of the present invention will be described with reference to FIG. 2.

Figure 2:
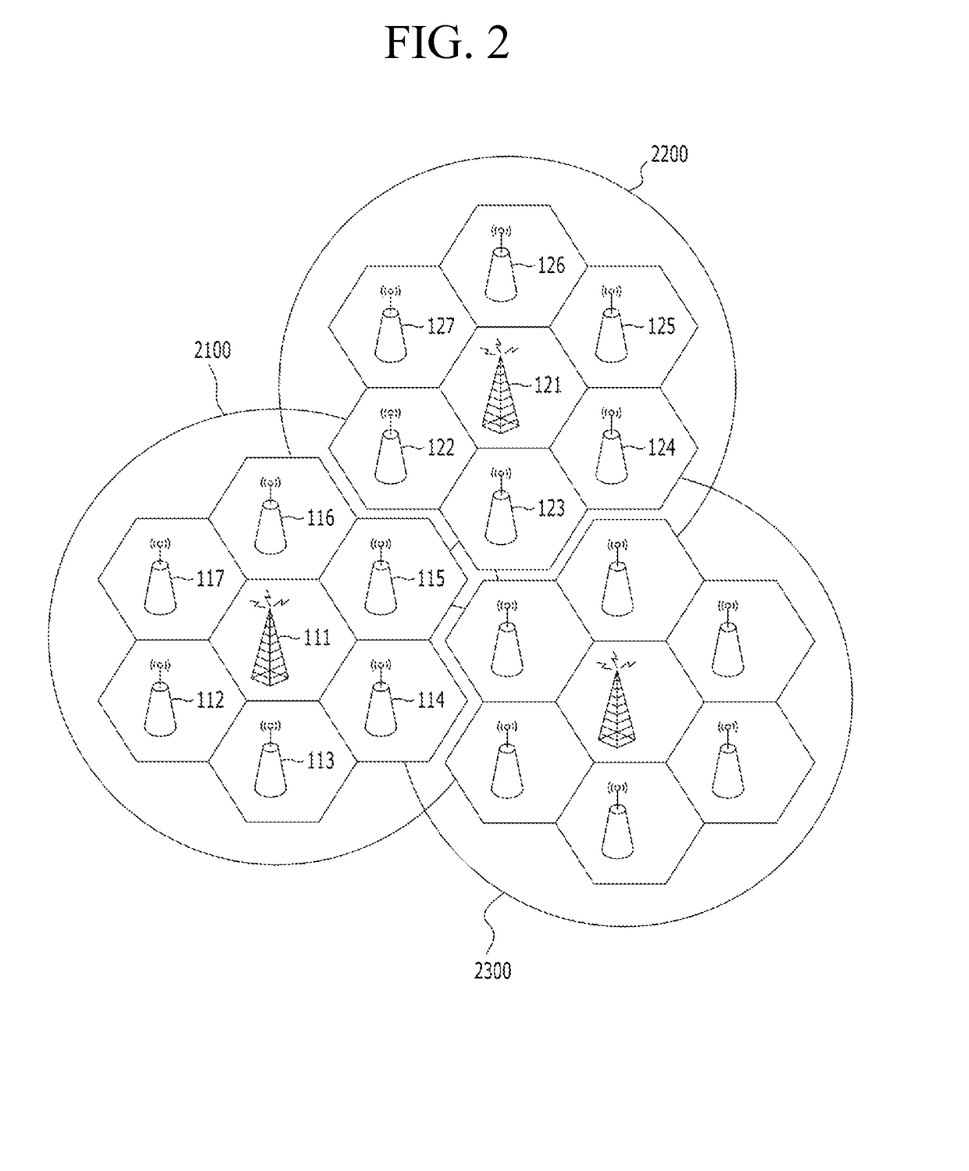
FIG. 2 shows a cell structure in accordance with embodiments of the present invention.

FIG. 2 shows a cell structure in accordance with embodiments of the present invention.

Referring to FIG. 2, base station system 100 may include a plurality of cells 2100, 2200, and 2300. Each one of cells 2100, 2200, and 2300 may include one macro radio unit and a plurality of cooperative radio units. For example, cell 2100 may include macro radio unit 111 and a plurality of cooperative radio units 112, 113, 114, 115, 116, and 117. Furthermore, cell 2200 may include macro radio unit 121 and a plurality of cooperative radio units 122, 123, 124, 125, 126, and 127. The cell structure of cell 2100 will be representatively described, hereinafter. Cell 2200 and Cell 2300 may have the similar cell structure of cell 2100.

As described, cell 2100 may include macro radio unit 111 and a plurality of cooperative radio units 112, 113, 114, 115, 116, and 117. Macro radio unit 111 may manage overall communication processes in cell 2100. Macro radio unit 111 may be operated as a repeater mode and a typical sector mode. Macro radio unit 111 may always duplicate a signal and transmit the duplicated signals in the repeater mode. Macro radio unit 111 may transmit a signal to all user equipment located within cell 2100 with high transmission power.

Cooperative radio units 112 to 117 may transmit and receive signals to/from one or more user equipment located within a comparatively short distance therefrom. Cooperative radio units 112 to 117 may transmit signals with transmission power smaller than that of macro radio unit 111. Cooperative radio units 112 to 117 may transmit signals when it is required.

Such macro radio unit 111 and plurality of cooperative radio units 112 to 117 may be controlled by corresponding digital unit 200. In accordance with embodiments of the present invention, digital unit 200 may control and manage radio unit 111 and cooperative radio units 112 to 117 in the same cell in order to efficiently use radio resources and to maximize radio capacity. Hereinafter, a method for managing a plurality of radio units in a cell to efficiently use radio resources and to maximize radio capacity in accordance with embodiments of the present invention will be described with reference to FIG. 3 to FIG. 6.

Figure 3:
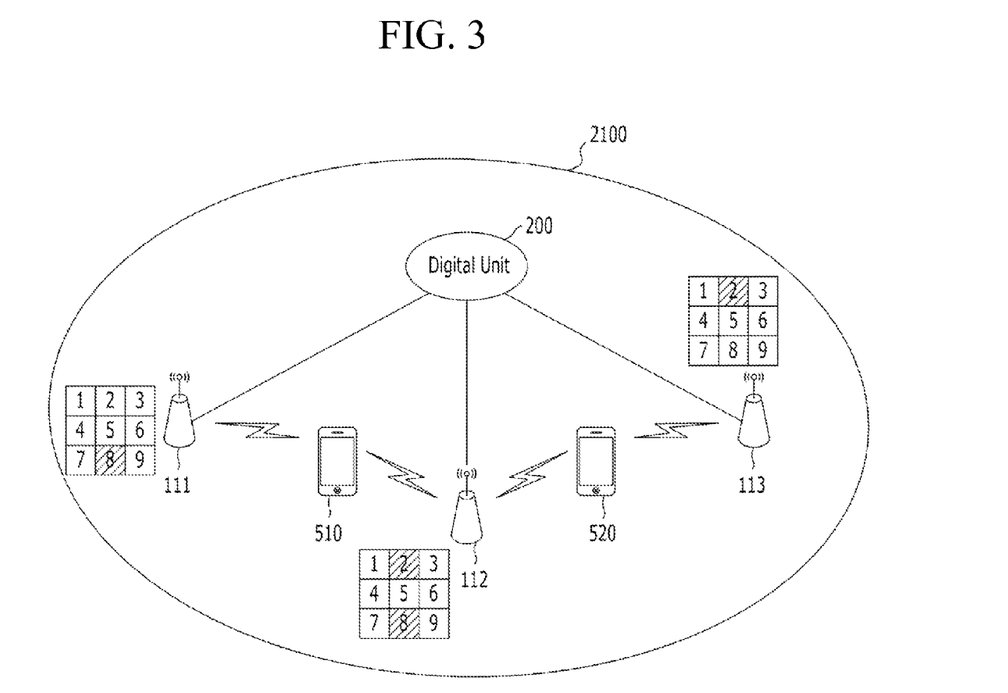
FIG. 3 shows signal transmission in a base station system in accordance with embodiments of the present invention.

FIG. 3 shows signal transmission in a base station system in accordance with embodiments of the present invention.

Referring to FIG. 3, cell 2100 may include three radio units 111, 112, and 113. Three radio units 111, 112, and 113 may be a macro radio unit and/or a cooperative radio unit. Digital unit 200 may control and manage radio units 111, 112, and 113 in accordance with embodiments of the present invention. For example, digital unit 200 may control signal transmission in radio units 111, 112, and 113 in order to maximize radio capacity and efficiently use radio resources. In FIG. 3, digital unit 200 may be illustrated as being included in cell 2100, but the present invention is not limited thereto. Digital unit 200 may be installed at a location outside cell 2100.

Radio units 111, 112, and 113 may receive a signal from digital unit 200 and transmit the received signal to user equipment located within a corresponding service area thereof under the control of digital unit 200 in accordance with embodiments of the present invention. For example, radio units 111 and 112 may transmit a signal to user equipment 510 when user equipment 510 is located within an overlapping service area of radio units 111 and 112. Radio units 112 and 113 may receive a signal from or transmit a signal to user equipment 520 when user equipment 520 is located within an overlapping service area of radio units 112 and 113. Accordingly, user equipment may receive signals from at least one of radio units when user equipment is located at an overlapping service of the at least one of radio units in accordance with embodiments of the present invention.

In accordance with embodiments of the present invention, radio units 111 and 112 may transmit the same data using the same channel to user equipment 510 in response to the control of digital unit 200 when user equipment 510 is located within an overlapping service area of radio units 111 and 112. That is, digital unit 200 may use two radio units 111 and 112 to transmit a data signal to user equipment 510 located in the overlapping service area. Accordingly, radio units 111 and 112 may transmit the same data signal to user equipment 510 through the same channel. Radio units 112 and 113 may transmit the same data using the same channel to user equipment 520 in response to the control of digital unit 200 when user equipment 520 is located within an overlapping service area of radio units 112 and 113. That is, digital unit 200 may use two radio units 112 and 113 to transmit a data signal to user equipment 520 located in the overlapping service area. Accordingly, radio units 112 and 113 may transmit the same data signal to user equipment 520 through the same channel. In case of orthogonal frequency division multiplexing (OFDM), radio units 111, 112, and 113 may transmit the same data to user equipment 510 or user equipment 520 through a data channel using the same symbol or the same subcarrier. In case of wideband code division multiple access (WCDMA), radio units 111, 112, and 113 may transmit the same data to user equipment 510 or user equipment 520 through a data channel using the same code.

Particularly, radio units 111 and 112 may use an $8^{th}$ channel to transmit the same data signals to user equipment 510 when user equipment 510 is located at an overlapping service area of radio units 110 and 120. Furthermore, radio units 112 and 113 may use a $2^{nd}$ channel to transmit the same data signal to user equipment 520 when user equipment 520 is located at an overlapping service area of radio units 112 and 113. When user equipment 510 and 520 are located at edge of a respective service area, user equipment 510 and 520 may receive low quality signals from corresponding radio units. If at least two radio units transmit the same data signal to user equipment in a corresponding overlapping service area, the signal quality may be improved.

As shown in FIG. 3, user equipment 510 and 520 may receive the same data signals from at least one radio unit through the same channels in accordance with embodiments of the present invention. For example, user equipment 510 may receive the same data signal from radio units 111 and 112 through the same $8^{th}$ channel. When user equipment 510 receives the same data signal through the same channel, user equipment 510 may recognize the received data signals as a multipath signal and restore an original signal by combining the received signals in accordance with embodiments of the present invention. Furthermore, user equipment 520 may receive the same data signal from radio units 112 and 113 through the same $2^{nd}$ channel. When user equipment 520 receives the same data signal through the same $2^{nd}$ channel, user equipment 520 may recognize the received data signal as a multipath signal and restore an original signal by combining the received signals in accordance with embodiments of the present invention. Accordingly, the quality of data signals received at the user equipment may be improved.

Digital unit 200 may control radio units 111 and 112 to transmit the same data signal using the same channel to user equipment 510 located in the overlapping service areas of radio units 111 and 112. That is, digital unit 200 may use both of radio units 111 and 112 to transmit a data signal to user equipment 510 located in the overlapping service area of radio units 111 and 112. Digital unit 200 may determine whether to transmit the same data signal using the same channel based on a signal quality in a location of user equipment. Such operation will be described hereinafter.

At first, each one of radio units 111 and 112 may measure signal intensity of a signal received from user equipment 510 and transmit the measurement to digital unit 200. For example, radio unit 111 may transmit the measurement $S_a$ of signal intensity to digital unit 200 and radio unit 112 may transmit the measurement $S_b$ of signal intensity to digital unit 200. Then, digital unit 200 may evaluate the signal quality of uplink signals of user equipment 510 based on the measurements $S_a$ and $S_b$ received from radio units 111 and 112. Digital unit 200 may use equation below to evaluate the signal quality.

$$|S_a - S_b| < S_{th} \qquad \text{Eq. 1}$$

In Eq. 1, a value $S_a$ may denote signal intensity of a signal transmitted from user equipment 510 to radio unit 111. A value $S_b$ may denote signal intensity of a signal transmitted from user equipment 510 to radio unit 112. A value $S_{th}$ may denote a predetermined threshold.

As described, when the difference between the measurements $S_a$ and $S_b$ is smaller than the predetermined threshold $S_{th}$, digital unit 200 may control both radio units 111 and 112 to transmit the same data signal to user equipment 510 through the same channel. When the difference is equal to or larger than the predetermined threshold $S_{th}$, digital unit 200 may control one of radio units 111 and 112, which transmit the larger measurement to transmit a data signal to user equipment 510. The threshold $S_{th}$ may be determined based on various factors related to communication environment.

Figure 4:
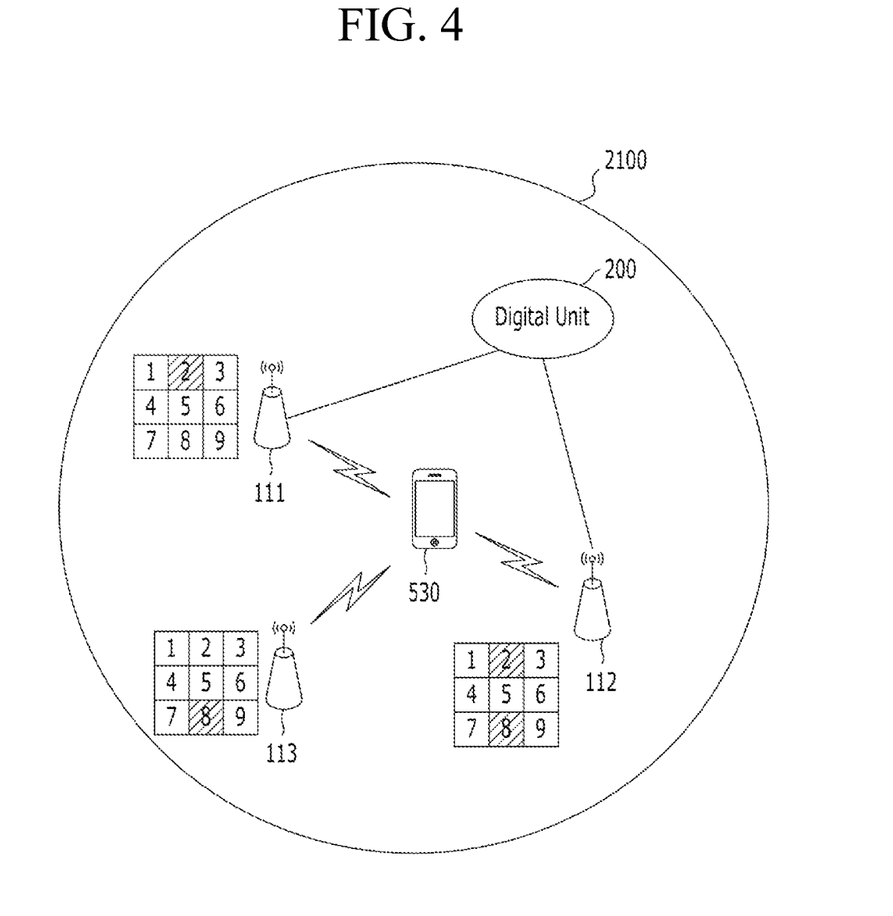
FIG. 4 shows signal transmission in a base station system in accordance with another embodiment of the present invention.

FIG. 4 shows signal transmission in a base station system in accordance with another embodiment of the present invention Referring to FIG. 4, cell 2100 may include three radio units 111, 112, and 113. Three radio units 111, 112, and 113 may be a macro radio unit and/or a cooperative radio unit. Digital unit 200 may control and manage radio units 111, 112, and 113 in accordance with embodiments of the present invention. For example, digital unit 200 may control signal transmission in radio units 111, 112, and 113 in order to maximize radio capacity and efficiently use radio resources. In FIG. 4, digital unit 200 may be illustrated as being included in cell 2100, but the present invention is not limited thereto. Digital unit 200 may be installed at a location outside cell 2100.

Radio units 111, 112, and 113 may receive a signal from digital unit 200 and transmit the received signal to user equipment 530 located within an overlapping service area of radio units 111, 112, and 113 under the control of digital unit 200 in accordance with embodiments of the present invention. Accordingly, user equipment 530 may receive signals from at least one of radio units 111, 112, and 113 when user equipment 530 is located at the overlapping service of radio units 111, 112, and 113 in accordance with embodiments of the present invention.

In accordance with embodiments of the present invention, at least two of radio units 111, 112, and 113 may transmit the same data signal using the same channel to user equipment 530 when user equipment 530 is located within the overlapping service area of radio units 111, 112, and 113. In case of OFDM, at least two of radio units 111, 112, and 113 may transmit the same data signal to user equipment 530 through a data channel using the same symbol or the same subcarrier. In case of WCDMA, at least two of radio units 111, 112, and 113 may transmit the same data to user equipment 530 through a data channel using the same code.

Particularly, at least two of radio units 111, 112, and 113 may use a $8^{th}$ channel to transmit the same data signals to user equipment 530 when user equipment 530 is located at an overlapping service area of radio units 111, 112, and 113. When user equipment 530 is located at edge of a respective service area, user equipment 530 may receive low quality signals from corresponding radio units. If at least two radio units transmit the same data signal to different user equipment in a corresponding overlapping service area, the signal quality may be improved.

As shown in FIG. 4, user equipment 530 may receive the same data signals from at least one radio unit through the same channels in accordance with embodiments of the present invention. For example, user equipment 530 may receive the same data signal from at least two of radio units 111, 112, and 113 through the same $8^{th}$ channel. When user equipment 530 receives the same data signal through the same channel, user equipment 530 may recognize the received data signals as a multipath signal and restore an original signal by combining the received signals in accordance with embodiments of the present invention. Accordingly, the quality of data signals received at the user equipment may be improved.

Digital unit 200 may control at least two of radio units 111, 112, and 113 to transmit the same data signal using the same channel to user equipment 530 located in the overlapping service areas of radio units 111, 112, and 113. That is, digital unit 200 may use at least two of radio units 111, 112, and 113 to transmit a data signal to user equipment 530 located in the overlapping service areas of radio units 111, 112, and 113. Accordingly, at least two of radio units 111, 112, and 113 may transmit the same data signal to user equipment 530. Digital unit 200 may determine whether to transmit the same data signal using the same channel based on a signal quality in a location of user equipment. Such operation will be described hereinafter.

At first, each one of radio units 111, 112, and 113 may measure signal intensity of a signal received from user equipment 530 and transmit the measurement to digital unit 200. For example, radio unit 111 may transmit the measurement $S_x$ of signal intensity to digital unit 200, radio unit 112 may transmit the measurement $S_y$ of signal intensity to digital unit 200, and radio unit 113 may transmit the measurement $S_z$ of signal intensity to digital unit 200. Then, digital unit 200 may evaluate the signal quality of uplink signals of user equipment 530 based on the measurements $S_x$, $S_y$, and $S_z$ received from radio units 110 and 120. Digital unit 200 may select the largest one $S_{largest}$ of the measurements $S_x$, $S_y$, and $S_z$. Then, digital unit 200 may use equation below to evaluate the signal quality.

$$|S_{largest} - S_x| < S_{th} \qquad \text{Eq. 2}$$

In Eq. 2, a value $S_x$ may denote signal intensity of a signal transmitted from user equipment 530 to radio unit 111. A value $S_y$ may denote signal intensity of a signal transmitted from user equipment 530 to radio unit 112. A value $S_z$ may denote signal intensity of a signal transmitted from user equipment 530 to radio unit 113. A value $S_{largest}$ may denote the largest one selected from the received measurements $S_x$, $S_y$, and $S_z$. $S_{th}$ may denote a predetermined threshold.

As described, when the difference between the largest measurement $S_{largest}$ and one of the measurements $S_x$, $S_y$, and $S_z$ is smaller than the predetermined threshold $S_{th}$, digital unit 200 may control at least two of radio units 111, 112, and 113 to transmit the same data signal to user equipment 530 through the same $8^{th}$ channel. When the difference is equal to or larger than the predetermined threshold $S_{th}$, digital unit 200 may control one of radio units 111, 112, and 113, which transmit the larger measurement to transmit a data signal to user equipment 530. Eq.2 is described as subtracting the measurement $S_x$ from the largest measurement $S_{largest}$, but the present invention is not limited thereto. Any one of the measurements $S_x$, $S_y$, and $S_z$ may be subtracted from the largest measurement $S_{largest}$. Furthermore, the second largest measurement may be subtracted from the largest measurement $S_{largest}$. The threshold $S_{th}$ may be determined based on various factors related to communication environment. Hereinafter, digital unit for controlling radio units in accordance with embodiments of the present invention will be described with reference to FIG. 5.

Figure 5:
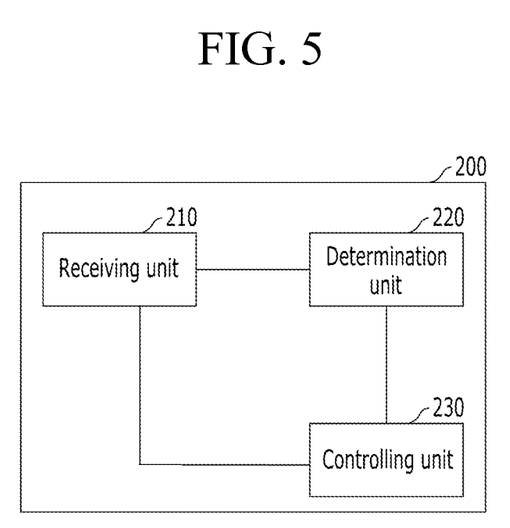
FIG. 5 shows a digital unit in accordance with embodiments of the present invention.

FIG. 5 shows a digital unit in accordance with embodiments of the present invention.

Referring to FIG. 5, digital unit 200 may include receiver 210, determination unit 220, and controlling unit 230. As described, digital unit 200 may control the signal transmission in radio units coupled thereto in accordance with embodiments of the present invention. For example, digital unit 200 may select one or multiple radio units to transmit the same data signal through the same channel based on the signal quality of uplink signal of related user equipment in accordance with embodiments of the present invention.

Receiver 210 may receive signal quality measurements from radio units 111, 112, and 113 coupled to digital unit 200. For example, receiver 210 of digital unit 200 may receive signal quality measurements from radio units 111, 112, and 113. In order to receive the signal quality measurement, digital unit 200 may request such signal quality measurement to radio units 111, 112, and 113 coupled to digital unit 200. In response to the request, radio units 111, 112, and 113 may measure signal intensity of a signal received from coupled user equipment and transmit the measurement to digital unit 200. The present invention, however, is not limited thereto. Radio units 111, 112, and 113 may regularly measure the signal intensity of signals received from user equipment and report the measurements to digital unit 200.

Determination unit 220 may determine whether a data signal is transmitted through multiple radio units or one radio unit based on the received measurements in accordance with embodiment of the present invention. For example, determination unit 220 of digital unit 200 may count the received measurements related to one user equipment. For example, receiver 210 of digital unit 200 may receive two measurements $S_a$ and $S_b$ from radio units 111 and 112 when user equipment 510 is located at an overlapping service area of radio units 111 and 112 as shown in FIG. 3. Furthermore, receiver 210 of digital unit 200 may receive three measurements $S_x$, $S_y$, and $S_z$ from radio units 111, 112, and 113 when user equipment 530 is located at an overlapping service area of radio units 111, 112, and 113 as shown in FIG. 4. When the received measurements related to one user equipment is not more than two, determination unit 220 may calculate a difference of the received measurements and compare the difference with the predetermined threshold $S_{th}$. For example, when receiver 210 receives two measurements $S_a$ and $S_b$ from radio units 111 and 112 because user equipment 510 is located at an overlapping service area of radio units 111 and 112 as shown in FIG. 3, determination unit 220 may calculate a difference between the received measurements $S_a$ and $S_b$ and compare the difference with the predetermined threshold $S_{th}$. Such determination result may be transmitted to controller unit 230.

When the received measurements related to one user equipment is more than two, determination unit 220 may select the largest one from the received measurements. For example, when receiver 210 receives three measurements $S_x$, $S_y$, and $S_z$ from radio units 111, 112, and 113 because user equipment 530 is located at an overlapping service area of radio units 111, 112, and 113 as shown in FIG. 4, determination unit 220 may select the largest measurement $S_{largest}$ from the received measurements $S_x$, $S_y$, and $S_z$. Then, determination unit 220 may subtract anyone of the received measurements $S_x$, $S_y$, and $S_z$ from the selected largest measurement and compare the subtraction result with a predetermined threshold $S_{th}$. The determination unit 220 may transfer the determination result to controlling unit 230.

Controlling unit 230 may control coupled radio units based on the determination result received from determination unit 220. For example, when the subtraction result of the largest measurement and any one of the received measurements is smaller than the predetermined threshold $S_{th}$, controlling unit 230 may control related multiple radio units to transmit the same data signal using the same channel. For example, when the subtraction result is smaller than the predetermined threshold $S_{th}$, controlling unit 230 may control at least two of radio units 111, 112, and 113 to transmit a data signal to user equipment 530 using the same $8^{th}$ channel in accordance with embodiments of the present invention. Accordingly, at least two of radio units 111, 112, and 113 may transmit the same data signal to user equipment 530 using the same channel.

Furthermore, when the subtraction result is equal to or larger than the predetermined threshold $S_{th}$, controlling unit 230 may control one of radio units to transmit a data signal using a channel in accordance with embodiments of the present invention. For example, when the subtraction result is equal to or larger than the predetermined threshold $S_{th}$, controlling unit 230 may select one of radio units 111, 112, and 113 to transmit a data signal to user equipment 530 in accordance with embodiments of the present invention. For example, controlling unit 230 may select the one transmitting the largest measurement to transmit the data signal to user equipment 510. The present invention, however, is not limited thereto. Controlling unit 230 may select a radio unit based on various factors such as a distance or a processing load. For example, controlling unit 230 may select a radio unit closest to user equipment 510.

When the difference is smaller than the predetermined threshold $S_{th}$ based on the received determination result, controlling unit 230 may control related two radio units to transmit the same data signal using the same channel. For example, when the difference is smaller than the predetermined threshold $S_{th}$, controlling unit 230 of digital unit 200 may control radio units 111 and 112 to transmit the same data signal to user equipment 510 using the same $8^{th}$ channel in accordance with embodiments of the present invention. When the difference is equal to or larger than the predetermined threshold $S_{th}$ based on the received determination result, controlling unit 230 may control one of radio units to transmit a data signal using a channel. Furthermore, when the difference is equal to or larger than the predetermined threshold $S_{th}$ based on the determination result, controlling unit 230 may select one of radio units 111 and 112 to transmit a data signal to user equipment 510 in accordance with embodiments of the present invention. For example, controlling unit 230 may select the one transmitting the largest measurement to transmit the data signal to user equipment 510. The present invention, however, is not limited thereto. Controlling unit 230 may select a radio unit based on various factors such as a distance and a load. For example, controlling unit 230 may select a radio unit closest to user equipment 510. Alternatively, controlling unit 230 may select a radio unit having fewer loads in order to transmit the data signal to user equipment 510.

As described, digital unit 200 may control multiple radio units to transmit the same data signal to user equipment through the same channel in accordance with embodiments of the present invention. Hereinafter, such an operation of digital unit 200 for maximizing a radio capacity in a base station system in accordance with embodiment of the present invention will be described with reference to FIG. 6.

Figure 6:
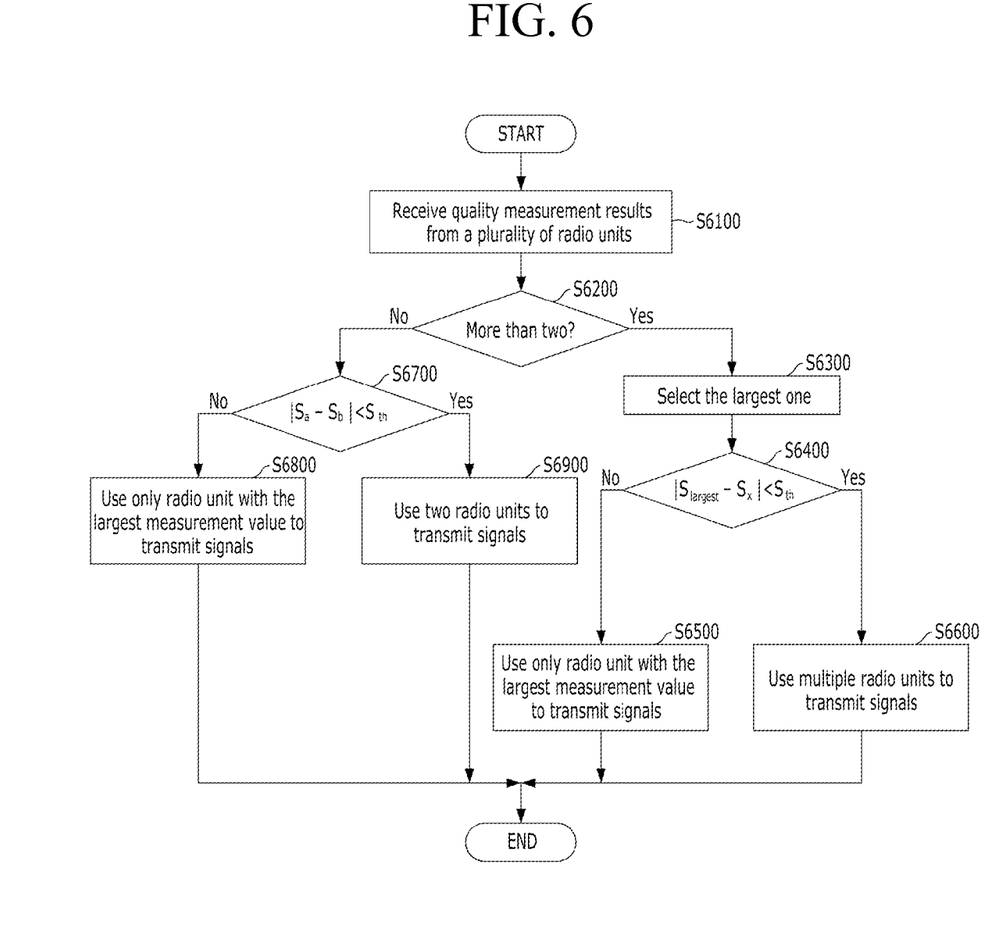
FIG. 6 shows a method for controlling radio units by a corresponding digital unit in accordance with embodiments of the present invention.

FIG. 6 shows a method for controlling radio units by a corresponding digital unit in accordance with embodiments of the present invention.

Referring to FIG. 6, signal quality measurements may be received from a plurality of radio units in a cell at step S6100. For example, digital unit 200 may receive signal quality measurements from radio units 111, 112, and 113. In order to receive the signal quality measurement, digital unit 200 may request such signal quality measurement to radio units 111, 112, and 113 coupled to digital unit 200. In response to the request, radio units 111, 112, and 113 may measure signal intensity of a signal received from coupled user equipment and transmit the measurement to digital unit 200. The present invention, however, is not limited thereto. Radio units 111, 112, and 113 may regularly measure the signal intensity of signals received from user equipment and report the measurements to digital unit 200.

Determination may be made whether more than two measurements related to one user equipment is received at step S6200. For example, digital unit 200 may count the measurements related to one user equipment. Digital unit 200 may receive two measurements $S_a$ and $S_b$ from radio units 111 and 112 when user equipment 510 is located at an overlapping service area of radio units 111 and 112 as shown in FIG. 3 Digital unit 200 may receive three measurements $S_x$, $S_y$, and $S_z$ from radio units 111, 112, and 113 when user equipment 530 is located at an overlapping service area of radio units 111, 112, and 113 as shown in FIG. 4.

When the received measurements related to one user equipment is more than two (Yes—S6200), the largest one may be selected from the received measurements at step S6300. For example, when digital unit 200 receives three measurements $S_x$, $S_y$, and $S_z$ from radio units 111, 112, and 113 because user equipment 530 is located at an overlapping service area of radio units 111, 112, and 113 as shown in FIG. 4, digital unit 200 may select the largest measurement $S_{largest}$ from the received measurements $S_x$, $S_y$, and $S_z$.

At step S6400, anyone of the received measurements $S_x$, $S_y$, and $S_z$ may be subtracted from the selected largest measurement and the subtraction result may be compared with a predetermined threshold $S_{th}$. For example, digital unit 200 may subtract anyone of the received measurements $S_x$, $S_y$, and $S_z$ may be subtracted from the selected largest measurement $S_{largest}$. Digital unit 200 may select the second largest measurement from the received measurements and subtract the second largest measurement from the largest measurement. Then, digital unit 200 may compare the subtraction result with the predetermined threshold $S_{th}$. Based on the comparison result, digital unit 200 may differently control signal transmission in radio units 111, 112, and 113.

When the subtraction result is smaller than the predetermined threshold $S_{th}$ (Yes—S6400), at least two of related multiple radio units may be control to transmit the same data signal using the same channel at step S6600. For example, when the subtraction result is smaller than the predetermined threshold $S_{th}$, digital unit 200 may control at least two of radio units 111, 112, and 113 to transmit the same data signal to user equipment 530 using the same $8^{th}$ channel in accordance with embodiments of the present invention. That is, digital unit 200 may simultaneously use at least two of radio units 111, 112, and 113 to transmit a data signal to user equipment 530. Accordingly, the at least two of radio units 111, 112, and 113 may transmit the same data signal to user equipment 530 through the same channel.

When the subtraction result is equal to or larger than the predetermined threshold $S_{th}$ (No—S6400), one of radio units may be control to transmit a data signal using a channel at step S6500. For example, when the subtraction result is equal to or larger than the predetermined threshold $S_{th}$, digital unit 200 may select one of radio units 111, 112, and 113 to transmit a data signal to user equipment 530 in accordance with embodiments of the present invention. For example, digital unit 200 may select one transmitting the largest measurement may be selected to transmit the data signal to user equipment 510. The present invention, however, is not limited thereto. A radio unit for transmitting the data signal may be selected based on various factors. For example, a radio unit closest to user equipment 510 may be selected.

When the received measurements related to one user equipment is not more than two (No—S6200), a difference of the received measurements may be compared with the predetermined threshold $S_{th}$ at step S6700. For example, when digital unit 200 receives two measurements $S_a$ and $S_b$ from radio units 111 and 112 because user equipment 510 is located at an overlapping service area of radio units 111 and 112 as shown in FIG. 3, digital unit 200 may calculate a difference between the received measurements $S_a$ and $S_b$ and compare the difference with the predetermined threshold $S_{th}$.

When the difference is smaller than the predetermined threshold $S_{th}$ (Yes—S6700), related two radio units may be control to transmit the same data signal using the same channel at step S6900. For example, when the difference is smaller than the predetermined threshold $S_{th}$, digital unit 200 may control radio units 111 and 112 to transmit the same data signal to user equipment 510 using the same $8^{th}$ channel in accordance with embodiments of the present invention. That is, digital unit 200 may simultaneously use radio units 111 and 112 to transmit a data signal to user equipment 510. Accordingly, radio units 111 and 112 may transmit the same data signal to user equipment 510 through the same channel.

When the difference is equal to or larger than the predetermined threshold $S_{th}$ (No—S6700), one of radio units may be controlled so as to transmit a data signal using a channel at step S6800. For example, when the difference is equal to or larger than the predetermined threshold $S_{th}$, digital unit 200 may select one of radio units 111 and 112 to transmit a data signal to user equipment 510 in accordance with embodiments of the present invention. For example, digital unit 200 may select one transmitting the largest measurement may be selected to transmit the data signal to user equipment 510. The present invention, however, is not limited thereto. A radio unit for transmitting the data signal may be selected based on various factors such as a distance and a load. For example, a radio unit closest to user equipment 510 may be selected. Alternatively, a radio unit having less load may be selected to transmit the data signal to user equipment 510.

When user equipment 510, 520, and 530 receive the signals from radio units 111, 112, and 113, user equipment 510, 520, and 530 may recognize the multipath signal if the same data signals are received through the same channel. In this case, user equipment 510, 520, and 530 may restore an original signal by combining the received data signals. In this manner, high quality service may be provided to user equipment although user equipment is located at edge of a service area in accordance with embodiments of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling signal transmission in a plurality of radio units coupled to a digital unit where the digital unit is located in centralized location and is spatially separated from the plurality of radio units, and each one of radio units is located at a corresponding service call area with an antenna and each forms an independent cell different from cells formed by neighbor radio units, the method comprising:
 receiving, by the digital unit, from multiple radio units, signal quality measurements of a user equipment located within an overlapping service area among cells of the multiple radio units;

determining, by the digital unit, whether to simultaneously use at least two of the multiple radio units located in different cells to transmit a data signal to the user equipment based on the received signal quality measurements; and controlling, by the digital unit, at least two of the multiple radio units in different cells to transmit a same data signal to the user equipment using a same channel based on the determination result, wherein the controlling includes allocating one of a same symbol and a same subcarrier to the at least two of multiple radio units to transmit the same data signal when orthogonal frequency division multiplexing (OFDM) is employed.

2. The method of claim 1, wherein the receiving signal quality measurements includes:

requesting each one of the multiple radio units to measure a signal quality of a signal received from the user equipment, wherein each one of the multiple radio units measures the signal quality of a signal received from the user equipment and transmits the signal quality measurement to the digital unit.

3. The method of claim 1, wherein the signal quality measurements are a result of measuring a signal intensity of a signal received from the user equipment to each one of the multiple radio units.

4. The method of claim 1, wherein the determining includes:

determining whether the received signal quality measurements are more than two;

when the received signal quality measurements are more than two, selecting a largest signal quality measurement from the received signal quality measurements;

obtaining a difference between the selected largest signal quality measurement and any other signal quality measurement included in the received signal quality measurements;

comparing the difference with a predetermined threshold; and determining whether to transmit the same data signal to the user equipment using at least two of the multiple radio units based on the comparison result.

5. The method of claim 1, wherein the determining includes:

determining whether the received signal quality measurements are at least two;

when the received signal quality measurements are two, obtaining a difference between the two received signal quality measurements;

comparing the difference with a predetermined threshold; and determining whether to transmit the same data signal to the user equipment using at least two of the multiple radio units based on the comparison result.

6. The method of claim 4, wherein the controlling at least two of the multiple radio units includes:

when the difference is smaller than the predetermined threshold, transmitting the same data signal to the user equipment by simultaneously using the at least two of the multiple radio units.

7. The method of claim 4, wherein the controlling at least two of the multiple radio units includes:

when the difference is smaller than the predetermined threshold, allocating the same channel to the at least two of the multiple radio units to transmit the same data signal.

8. The method of claim 1, wherein the controlling at least two of the multiple radio units to transmit a same data signal to the user equipment includes:

at the user equipment, recognizing the received data signals as a multipath signal when the same data signals are received through the same channel from at least two radio units; and restoring an original signal by combining the received data signals from the at least two radio units.

9. The method of claim 1, wherein the controlling includes allocating a same code to the at least two of multiple radio units to transmit the same data signal when wideband code division multiple access (WCDMA) is employed.

10. A digital unit for controlling signal transmission in a plurality of radio units, wherein each one of the plurality of radio units is located in a cell different from a cell of the digital unit, is coupled to the digital unit through a communication network, located at a corresponding service cell area with an antenna, an independent cell from cells of neighbor radio units, and spatially separated from the digital unit, the digital unit comprising:

a receiver configured to receive signal quality measurements from multiple radio units when user equipment is located within an overlapping service area of the multiple radio units;

a determination unit configured to determine whether to simultaneously use at least two of the multiple radio units located in different cells to transmit a data signal to the user equipment based on the received signal quality measurements; and a controlling unit configured to control at least two of the multiple radio units located in different cells to transmit a same data signal to the user equipment using a same channel based on the determination result, wherein the controlling unit is configured to allocate one of a same symbol and a same subcarrier to the at least two of multiple radio units to transmit the same data signal when orthogonal frequency division multiplexing (OFDM) is employed.

11. The digital unit of claim 10, wherein each one of the multiple radio units measures the signal quality of a signal received from the user equipment and transmits the signal quality measurement to the digital unit.

12. The digital unit of claim 10, wherein the signal quality measurements are a result of measuring a signal intensity of a signal received from the user equipment to each one of the multiple radio units.

13. The digital unit of claim 10, wherein the determination unit is configured to:

determine whether the received signal quality measurements are more than two;

when the received signal quality measurements are more than two, select a largest signal quality measurement from the received signal quality measurements, and obtain a difference between the selected largest signal quality measurement and any other signal quality measurement included in the received signal quality measurements; otherwise, when the received signal quality measurements are two, obtain a difference between the two received signal quality measurements;

compare the difference with a predetermined threshold; and determine whether to transmit the same data signal to the user equipment using at least two of the multiple radio units based on the comparison result.

14. The digital unit of claim 13, wherein the controlling unit is configured to:
transmit the same data signal to the user equipment by simultaneously using the at least two of the multiple radio units when the difference is smaller than the predetermined threshold.

15. The digital unit of claim 13, wherein the controlling unit is configured to:
allocate the same channel to the at least two of the multiple radio units to transmit the same data signal when the difference is smaller than the predetermined threshold.

16. The digital unit of claim 10, wherein the user equipment is configured to:
recognize the same data signals as a multipath signal when receiving the same data signals through the same channel from at least two radio units; and
restore an original signal by combining the received data signals from the at least two radio units.

17. A base station system comprising:
a plurality of radio units, each radio unit configured to measure a signal intensity value of a signal received from user equipment located within an overlapping service area of the plurality of radio units; and
a digital unit configured to receive the signal intensity values from the plurality of radio units and to determine whether to simultaneously use at least two of the plurality of radio units in different cells to transmit a data signal to the user equipment using a same channel,
wherein the digital unit is located in a cell spatially separated from the plurality of radio units each forms an independent cell and is located at the formed independent cell for providing a service to a corresponding service call area and each having an independent service area from neighbor radio units, and
wherein the digital unit is configured to allocate one of a same symbol and a same subcarrier to the at least two of multiple radio units to transmit the same data signal when orthogonal frequency division multiplexing (OFDM) is employed.

18. The base station system of claim 17, wherein the digital unit is configured to:
determine whether the received signal quality measurements are more than two;
when the received signal quality measurements are more than two, select a largest signal quality measurement from the received signal quality measurements, and obtain a difference between the selected largest signal quality measurement and any other signal quality measurement included in the received signal quality measurements; otherwise,
when the received signal quality measurements are two, obtain a difference between the two received signal quality measurements;
compare the difference with a predetermined threshold; and
transmit the same data signal to the user equipment by simultaneously using the at least two of the multiple radio units when the difference is smaller than the predetermined threshold.

19. The base station system of claim 17, wherein the user equipment is configured to:
recognize the same data signals as a multipath signal when receiving the same data signals through the same channel from at least two radio units; and
restore an original signal by combining the received data signals from the at least two radio units.

* * * * *